United States Patent Office 3,013,874
Patented Dec. 19, 1961

3,013,874
HERBICIDAL METHOD EMPLOYING ALLYL
DIHYDROGEN PHOSPHATE
Richard R. Whetstone, Modesto, Calif., assignor to Shell Oil Company, a corporation of Delaware
No Drawing. Filed Jan. 13, 1959, Ser. No. 786,451
4 Claims. (Cl. 71—2.7)

This invention relates to the employment as a herbicide of allyl dihydrogen phosphate and to novel herbicidal compositions containing this compound. It has been found that allyl dihydrogen phosphate manifests a potent herbicidal action in the soil and is particularly effective when employed as a pre-emergence herbicide.

Allyl dihydrogen phosphate may be made as a crude mixture by reacting three moles of allyl alcohol with one mole of phosphorus pentoxide employing ethyl ether as a reaction diluent. For example, phosphorus pentoxide may be added to a solution of allyl alcohol in ethyl ether, the reaction being maintained at 10–20° C. Allyl dihydrogen phosphate may also be prepared by reacting allyl alcohol with polyphosphoric acid. In one experiment, for example, commercial polyphosphoric acid (81.4% $P_2O_5$) was reacted with a 15% molar excess of allyl alcohol. The reaction was mildly exothermic and proceeded at a rather slow rate at 25–30° C. Analysis showed that this reaction mixture contained over 50% allyl dihydrogen phosphate with the balance made up mainly of phosphoric acid and lesser amounts of allyl alcohol. In another experiment polyphosphoric acid was pretreated with $POCl_3$ to raise the $P_2O_5$ equivalent. The product of the reaction contained 62% allyl dihydrogen phosphate.

The outstanding herbicidal effectiveness of allyl dihydrogen phosphate is particularly surprising in view of the fact that diallyl hydrogen phosphate shows no herbicidal effectiveness whatsoever. Tests conducted under identical conditions also evidence the fact that triallyl phosphate is ineffective. It has also been discovered that lower alkyl phosphates do not manifest herbicidal activity. Yet in spite of the inactivity of structurally similar compounds allyl dihydrogen phosphate shows an extraordinary herbicidal effectiveness and has been found particularly promising as a pre-emergence herbicide and weed seed killer. This surprising herbicidal effectiveness of allyl dihydrogen phosphate as a herbicide is illustrated by the following experiment.

An acetone solution of a crude mixture containing approximately 50% diallyl hydrogen phosphate as the only active herbicidal ingredient was sprayed directly onto seed bed plots of 10 square feet. The phosphate solution was applied at the rate of 15 and 47 grams per plot, the plots being subsequently sprinkled with water. Six days after treatment, lettuce was planted in all plots. Twenty-three days after the initial treatment, weed control in the plot receiving the 15 grams treatment was 98%. The lettuce crop was considered excellent. The plot receiving the 47 gram treatment evidenced 99% weed control.

In another test, a crude mixture having 50% allyl dihydrogen phosphate as the only active ingredient was applied at the rate of 15 and 30 allyl alcohol equivalents per acre. Application was made directly to the soil in the form of an acetone solution and was found effective in preventing weed development in all plots.

Other tests clearly illustrate the unique activity of allyl dihydrogen phosphate when compared to pure triallyl phosphate and diallyl hydrogen phosphate. For example, in one experiment, wheat seeds were soaked in water solutions of pure allyl dihydrogen phosphate, pure diallyl hydrogen phosphate and pure triallyl phosphate for 21 hours. These solutions contained an equivalent amount of allyl alcohol (80 mg. allyl alcohol/50 ml.). The seeds were then thoroughly rinsed and allowed to germinate. Allyl dihydrogen phosphate killed the seeds, whereas di- and tri-allyl phosphate had no effect.

In yet another test, the equivalent of 20 gallons per acre of allyl alcohol was poured over soil in a petri dish containing a mixture of clover and millet seeds. Three cc. of solution was applied to 20 cc. of soil. The seeds and soil treated with allyl dihydrogen phosphate and a crude mixture containing as its only herbicidal compound allyl dihydrogen phosphate did not germinate whereas those of the untreated check as well as those treated with di- and tri-allyl phosphate did germinate.

In still another test, 0.1, 0.2, 0.3, 0.4, 0.5 and 1.0 mg. of allyl alcohol equivalents were added to the surface of field soil contained in one-inch test tubes to which clover and millet seed had been planted at one-quarter inch depth. Diallyl hydrogen phosphate did not kill seeds at all at the range of concentrations tried. Triallyl phosphate was also ineffective in killing the clover and millet seeds. A crude mixture containing approximately 50% allyl dihydrogen phosphate as the only active constituent was effective in killing seeds. Hence, it is apparent that whereas allyl dihydrogen phosphate is a highly effective weed seed killer di- and tri-allyl phosphates are altogether unsatisfactory as are lower alkyl phosphates. This unique and altogether surprising manifestation of herbicidal activity of allyl dihydrogen phosphate makes it particularly valuable as a pre-emergence herbicide.

Allyl dihydrogen phosphate may be employed alone or in combination with other herbicidal, fungicidal, viricidal, insecticidal or acaricidal materials, the action of which may be either internal or external, with plant nutritives, plant hormones, and the like. Wetting agents and, if desirable, stickers such as the heavy hydrocarbon oils with a minimum viscosity of 10° Engler at 50° C. can be present. The wetting agent must be non-reactive with phosphate. If the phosphate is employed in the form of emulsion or suspension, for example, in water, solvents such as oil, emulsifiers, emulsion stabilizers, and the like, may be added.

The allyl dihydrogen phosphate of the present invention may be applied by spraying with aqueous emulsions, solutions or suspensions. The rate of application of the spray liquid may vary considerably without departing from the scope of the invention. For example, the liquid may be sprayed at a rate of less than 75 to 100 gallons per acre. If spraying is effected with smaller quantities of liquid as in low volume spraying, high concentrations of the allyl dihydrogen phosphate should be employed. If desired, a minor amount in the order of about 0.01 to approximately 0.005% by weight of a wetting agent may be added to aid in forming a suspension. Particularly suitable wetting agents are the sodium salts of a mixture of secondary heptadecyl sulfates, sold commercially under the name of "Teepol" and polyethylene glycol ethers of alkyl phenols sold under the trade name of "Triton X-100" and "Triton X-155." Preferable concentrate compositions comprising the allyl dihydrogen phosphate of the present invention and a suitable wetting agent are prepared and the concentrate is then dispersed in water prior to use.

A further form in which the herbicidal compound of the present invention may be applied consists of solutions of the active ingredient in suitable inert liquid or semi-solid diluents in which the allyl dihydrogen phosphate is presently in molecularly dispersed form. The form in which the allyl dihydrogen phosphate is employed depends on the subject and purpose of the application as will be apparent to those well versed in the art.

Suitable inert solvents for the manufacture of liquid preparations should not be readily flammable, as odorless as possible and without any toxic effect on humans and animals when properly used. Neither should they have a corrosive effect on the components of the preparation or the material of the storage vessel. Examples of suitable solvents are highboiling oils, e.g., oils of vegetable origin such as castor oil, etc., and lower boiling solvents with a flash point of at least 30° C., such as carbon tetrachloride, ethylene dichloride, acetylene tetrachloride, hydrogenated naphthalene, alkylated naphthalene, sorbent naphtha, etc. Mixtures of solvents may also be used. Non-aromatic petroleum oils and xylene are commonly employed.

Allyl dihydrogen phosphate may also be applied in the form of dusts utilizing as the inert vehicle such materials as tricalcium phosphate, precipitated chalk, bentonite, kaolin, kieselguhr, etc.

Allyl dihydrogen phosphate may also be employed in the form of aerosols. When so used, the phosphate is dissolved or dispersed in a solvent boiling below room temperature at atmospheric pressure.

It will be understood that the quantity of allyl dihydrogen phosphate employed in the foregoing formulations may vary with the method of application, vehicle, etc. Thus, allyl dihydrogen phosphate may be present in a quantity varying from less than 1% by weight to over 50% by weight based on the total weight of the herbicidal composition. It will be understood that the present invention is not restricted to a specific weight concentration of the active ingredient or to specific carriers or diluents.

The method of application may vary considerably without departing from the scope of the invention. Thus, allyl dihydrogen phosphate may be applied to the entire area of a field. This procedure is called solid, or broadcast, application. The chemical may also be applied in rows or hills where the plants are to grow. It is preferable to inject the soil herbicide at uniform depth. However, it is also possible to apply the chemical as a surface treatment when mixed with water or with a powder carrier. When mixed with a higher boiling point diluent, the chemical may be injected into the soil. The chemical may be premixed with the seeds or applied as part of the seeding operation if desired. Other methods of application will also be apparent to those versed in the art, it being understood that the methods of application are not limited to those specifically enumerated.

I claim as my invention:

1. A method for the destruction of weeds comprising treating the locus of weed infestation with an herbicidally effective amount of allyl dihydrogen phosphate.

2. A method of preventing weed infestation comprising treating soil with a herbicidally effective quantity of allyl dihydrogen phosphate.

3. A method for the destruction of undesired plants comprising treating the locus of said plants with a herbicidally effective amount of allyl dihydrogen phosphate.

4. A method for preventing the growth of undesired plants comprising treating the soil environment of the seeds of said plants with a growth-preventing amount of allyl dihydrogen phosphate.

References Cited in the file of this patent

UNITED STATES PATENTS

| | | |
|---|---|---|
| 2,269,396 | Jayne | Jan. 6, 1942 |
| 2,272,668 | Honel | Feb. 10, 1942 |
| 2,495,958 | Craig et al. | Jan. 31, 1950 |
| 2,586,897 | Woodstock | Feb. 26, 1952 |
| 2,841,486 | Osborn et al. | July 1, 1958 |

OTHER REFERENCES

Sakaguchi in "Chemical Abstracts," vol. 45, col. 3025i and 3026a, 1951.

Defrance et al. in "Chemical Abstracts," vol. 41, col. 6010e, 1947.

King: "Insecticides and Repellants," Agri. Handbook, No. 69, issued May 1954 (page 46 relied on).